United States Patent

[11] 3,615,428

[72] Inventor Lucretia J. Weed
 Boston, Mass.
[21] Appl. No. 889,657
[22] Filed Dec. 31, 1969
[45] Patented Oct. 26, 1971
[73] Assignee Polaroid Corporation
 Cambridge, Mass.

[54] ADDITIVE DIFFUSION TRANSFER COLOR PHOTOGRAPHIC PROCESSES AND FILM UNITS FOR USE THEREWITH
44 Claims, 1 Drawing Fig.
[52] U.S. Cl. .................................................. 96/25,
 96/29 R, 96/118, 96/24
[51] Int. Cl. ....................................................... G03c 7/00,
 G03c 7/04, G03c 5/54
[50] Field of Search............................................. 96/25, 24,
 29 R, 118

[56] References Cited
UNITED STATES PATENTS
1,028,337  6/1912  Eastman.......................  96/25
2,698,245  12/1952  Land.............................  96/29 R Primary Examiner—Norman G. Torchin
Assistant Examiner—Alfonso T. Suro Pico
Attorneys—Brown and Mikulka, Philip G. Kiely and Robert M. Ford ABSTRACT: The present invention relates, in general, to a photographic film unit comprising a permanent laminate which includes a color screen carrying, in order, a layer comprising silver-precipitating nuclei, a layer comprising photosensitive silver halide crystals, and a layer comprising silver-precipitating nuclei, and to process employing such film unit for photographic color reproduction.

PATENTED OCT 26 1971
3,615,428
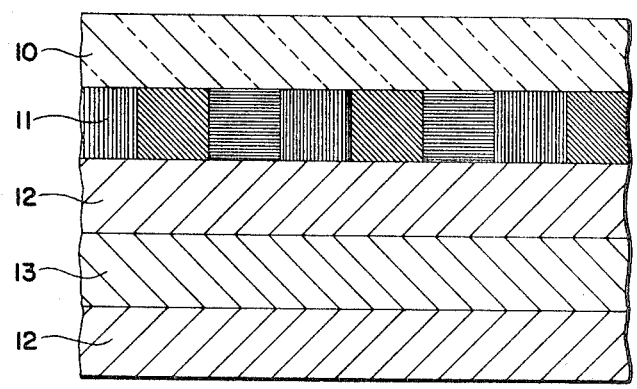
INVENTOR.
LUCRETIA J. WEED
BY Brown and Mikulka
and
Robert M. Ford
ATTORNEYS

ADDITIVE DIFFUSION TRANSFER COLOR PHOTOGRAPHIC PROCESSES AND FILM UNITS FOR USE THEREWITH

The present invention relates to photography and, more particularly, to photographic products and processes specifically adapted for color reproduction in accordance with the principles of additive color photography.

In general, color photographic reproduction may be provided by exposing a photoresponsive material such as, for example, a photosensitive silver halide emulsion, to selected subject matter through an optical screen element possessing filter media or screen elements of selected radiation modulating characteristics such as filter media selectively transmitting predetermined portions of the electromagnetic radiation spectrum's visible segment. The color information thus recorded is read out by viewing resultant image conformation in the photoresponsive material through the same or a similar screen element in appropriate registration with the image. For the reproduction of subject matter in color and in accordance with the principles of additive color photography, the individual filter media or screen elements constituting the optical screen will be constructed to effect selective filtration of predetermined portions of the visible electromagnetic spectrum substantially corresponding to its red, blue and green regions and color information recordation is accomplished by point-to-point incidence of radiation actinic to the selected photoresponsive material as modulated by such screen element. Visual reproduction of the information content recorded by the photoresponsive material is accomplished by read out of the impressed image as modulated by the original or a substantially identical screen element in accurate registration with the image record.

Additive color photographic reproduction thus may be provided by exposing a photoresponsive material, preferably a photosensitive silver halide emulsion, through an additive color screen having a plurality of filter media or screen element sets each of an individual additive color such as red, blue or green, and by viewing the resultant photographic image, preferably a silver image, subsequent to development of such image, through the same or a substantially identical screen element suitably registered.

Although for color information recordation purposes, the photoresponsive material and optical screen may comprise separate and distinct elements appropriately registered during periods of exposure and viewing the optical screen element may be temporarily or permanently positioned on the surface of a transparent carrier opposite that retaining the photoresponsive material, for practical purposes, it is preferred to permanently position the photoresponsive material in direct contiguous relationship to the color screen during exposure, in order to maximize the acuity of the resultant image record.

Subsequent to exposure of the photoresponsive material to actinic radiation transmitted through and filtered by the optical screen, the resultant photoexposed element may be further processed, where required, in accordance with the materials selected and generally without regard to the filter screen when the latter element is stable with respect to and/or protected from contact with the processing compositions and components selected. Such protection and stability will ordinarily be enhanced and facilitated by disposition of the filter screen between a transparent, processing composition impermeable carrier and the photoresponsive material, and, in particular, where such configuration additionally includes the presence of a processing composition barrier element or layer intermediate the screen and the photoresponsive material.

Subsequent to selective exposure of, for example, the preferred photoresponsive material, that is, photosensitive silver halide, the resultant exposed material may be processed in the same manner as black-and-white photographic film is conventionally processed. The photoexposed emulsion thus may be developed by any of the conventional developing procedures known in the art to be adapted to effect reduction of photoexposed silver halide crystals. In general, such development will be effected by contact of the photoexposed emulsion with a solution containing a conventional developing agent such as one or more of the conventional developing agents and compositions of the same set forth in Chapter 14 of *The Theory of the Photographic Process* (revised edition—1954), C. E. K. Mees, the MacMillan Co., New York, New York and Chapters VI, VII, VIII and IX of *Photographic Chemistry*, Volume I, P. Glafkides, Foundation Press, London, Eng. The preferred developing agents generally comprise organic compounds and, in particular, comprise organic compounds of the aromatic series containing at least two hydroxyl and/or amino groups wherein at least one of such groups is in one of ortho or para positions with respect to at least one other of such groups such as, for example, the various known hydroquinones, p-aminophenols, p-phenylene diamines, and their various known functional homologues and analogues. The developing composition containing the specific silver halide developing agents selected will generally comprise an aqueous solution additionally containing at least an alkaline material such as sodium hydroxide or sodium carbonate or the like and may be contacted with the photoexposed silver halide material according to any of the conventional tray, tank, or the like, procedures. The composition may additionally and optionally contain one or more specific silver halide-developing agents, preservatives, alkalis, restrainers, accelerators, etc., other than those specifically denoted in the cited reference material. The concentration of the various components employed may be varied over a wide range and, where desireable, any one or more of such components may be disposed in the photosensitive element, prior to exposure, and in a separate permeable layer of such element and/or in the emulsion comprising the photosensitive silver halide material itself.

For the purpose of stabilizing the developed image, the emulsion may be fixed in any of the conventional fixing, washing, and/or drying procedures known in the art as, for example those described in Chapter XI of *Photographic Chemistry*, Volume I, supra, and chamber 17 of *The Theory of the Photographic Process*, supra. For example, the photosensitive material retaining the developed image may be initially contacted with a stop bath adapted to terminate action of the developing agent on the photosensitive emulsion by converting the pH of the emulsion to that at which the selected silver halide-developing agent or agents exhibit substantially no developing potential. Specifically, where the silver halide-devloping agent is organic compound exhibiting its developing action in an alkaline pH, for example, a hydroquinone, or the like, the emulsion may be subjected to an acid stop bath for a sufficient time interval as to effectively neutralize the silver halide developing potential of the selected developing agent.

The emulsion may then be subjected to a fixing bath in order to effect removal of unexposed photoresponsive silver halide from the emulsion in accordance with the conventional procedures known to the art as adapted to effect same and as further detailed in the last cited references.

In general, the fixing agent employed may comprise a bath of a silver halide solvent such as sodium thiosulfate which is effective to remove substantially all types of silver halides from disposition in the emulsion strata originally containing the photosensitive silver halide without deleterious attack upon the conformation of the developed silver image. Subsequent to fixation, all residual traces of the fixing agent may be removed by aqueous wash contact, in order to insure that permanency of the developed image.

Where positive silver image formation is desired, that is, an image provided in terms of unexposed portions of the emulsion, reversal processing may be employed in its conventional manner, or a direct positive emulsion may be employed, or the positive image may be provided by diffusion transfer processing.

In the first alternative denoted above, the reversal processing may be accomplished in the conventional manner by developing the photoexposed emulsion by any of the conventional procedures known in the art as adapted to effect development of the latent image resultant from photoexposure such as, for example, the procedures identified above. Subsequent to development of the latent image to a visible silver image, the resultant developed image may be effectively removed in the conventional manner by contact of the image with any of the conventional agents known in the art as adapted to effect removal of a photographic silver image without deleterious effect upon unexposed photosensitive silver halide such as, for example, the bleaching agents and bleaching baths set forth in Chapter XXX of *Photographic Chemistry*, Volume II, supra. Subsequent to the removal of the developed image by, for example, bleaching, the photosensitive silver halide remaining in the emulsion structure may be converted to a developable state by physical fogging resultant from, for example, exposure to actinic radiation, and/or chemical fogging, for example by contact with a conventional fogging agent or the like, and, in turn, the resultant fogged silver halide may be developed and, where desired, stabilized, in the manner set forth above, to provide the requisite positive silver image formation.

In the second alternative denoted above the requisite positive silver image formation maybe provided by employment of a conventional direct positive silver halide emulsion which may be directly developed, in the presence of a fogging agent, according to the procedure described above, to provide the requisite positive silver image formation.

In the third alternative denoted above, the positive silver image formation may be provided by diffusion transfer processing wherein the latent image provided to the photosensitive halide emulsion by exposure is developed and, substantially contemporaneous with such development, a soluble complex is obtained, for example, by reaction of a silver halide solvent with unexposed and undeveloped silver halide of the emulsion. The resultant soluble silver complex may be, at least in part, transported in the direction of a suitable print-receiving element, and the silver of the complex precipitated in such element to provide the requisite positive silver image formation. Commensurate with the preceding alternatives denoted, the resultant positive silver image, in this embodiment, a silver transfer image, may be viewed through the same, or a similar, color screen element which in suitably registered with the positive silver transfer image carried by the print-receiving layer.

In each alternative, the preferred film units comprise a panchromatically sensitized photographic emulsion positioned contiguous a surface of a multicolor additive color screen which, in the last alternative denoted, may possess the print-receiving element intermediate a photographic emulsion and the color screen, either with or without a stripping layer positioned intermediate the print-receiving layer and the emulsion layer, to facilitate separation of the emulsion layer subsequent to transfer image formation. Employment of the preferred integral film unit allows exposure of the emulsion to be accomplished through a color screen, including through a transparent supporting member, if present, and formation of the requisite positive silver image in contiguous relationship to the color screen employed during exposure. Such embodiment accordingly obviates the necessity of registering the color screen with the resultant positive silver image, for viewing purposes, in that the screen employed for exposing may also be employed for viewing and is in automatic registration with the positive silver image.

Of the three alternatives denoted above, production of the positive image by diffusion transfer processing is clearly preferably to that denoted by the first alternative in view of the effective simplicity of the processing involved and is clearly preferable to that of the second embodiment by reason of the higher photographic speeds practicably obtainable.

Although, as disclosed in U.S. Pat. No. 2,614,926, the positive silver transfer image formation may be provided by and additive multicolor diffusion transfer reversal process which includes exposure of a silver halide emulsion layer through an additive color screen and separation of the emulsion layer through an additive color screen and separation of the emulsion layer, from contact with the remainder of the film unit, subsequent to processing, while retaining filter media and reception layer in fixed relationship, a preferred process will comprise that disclosed in U.S. Pats. Nos. 2,726,154, and 2,944,894, which are directed to a diffusion transfer reversal process which specifically includes exposure of an integral multilayer film assemblage through a screen possessing a plurality of minute optical elements and carrying photosensitive and image-receiving layers. As disclosed in the cited patents, transfer processing of the exposed film may be accomplished by permeation of the exposed integral film unit with a liquid processing composition and the image-receiving layer retained in permanent fixed relationship to the screen during, and subsequent to, formation of the requisite transfer image, with the operator's option of separating the photosensitive layer from the remainder of the film unit subsequent to transfer image formation.

In British Pat. No. 874,046, it is disclosed that two separate silver diffusion transfer additive color positive images or one additive color and one noncolor silver transfer positive images may be simultaneously provided, respectively, by exposure of a film unit which comprises two additive color screens each carrying an image-receiving layer and a photosensitive emulsion layer located intermediate the two separate image-receiving layers, one color screen and associated image-receiving layer located on each major surface of the emulsion layer, or a film unit which comprises an additive color screen carrying an image-receiving layer located on one major surface of a photosensitive emulsion layer and a noncolor image-receiving element located on the opposite surface of the emulsion layer and, subsequent to processing, separating the noncolor image-receiving element from its contiguous relationship with the emulsion.

However, for a plurality of reasons set forth in detail hereinafter, it would be particularly desirable to possess the wherewithal to fabricate an improved integral silver diffusion transfer film assemblage essentially comprising an optical screen element possessing, fixedly positioned in contiguous relationship to one surface, photoresponsive material directly providing positive image formation and possessing the sensitivity to incident electromagnetic radiation and acuity of image formation necessary to effectively provide color photographic image reproduction in accordance with the priniciples of additive color photography.

Accordingly, it is a principle object of the present invention to provide new and improved photographic products, compositions and processes particularly adapted for the photographic reproduction of subject matter in color and particularly in accordance with the principles of additive color photography.

Other objects of the invention will in part be obvious and will in part appear hereinafter.

The invention accordingly comprises the process of the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein the figure is a diagrammatic enlarged cross-sectional view illustrating the association of elements constituting one embodiment of the present invention, the thickness of the various material being exaggerated.

As previously stated, a silver diffusion transfer reversal process may provide a positive silver transfer image by development of the latent image provided a photosensitive silver halide emulsion by exposure and, substantially contemporaneous with such development, a soluble silver complex is obtained, by reaction of a silver halide solvent with unexposed and undeveloped silver halide of the emulsion. The resultant soluble silver complex is, at least in part, transported in the direction of a suitable print-receiving element and the silver of the complex there precipitated to provide the requisite positive silver image formation.

The silver receptive stratum employed may be so constituted as to provide an unusually effective silver precipitating environment which causes the silver deposited therein, in comparison with negative silver developed in the silver halide emulsion, to possess an extraordinarily high covering power, that is, opacity per given mass of reduced silver; see Edwin H. Land, One Step Photography, *Photographic Journal* Section A., pp. 7–15, Jan. 1950.

Specifically, to provide such environment, silver precipitation nuclei may be disposed within the silver receptive stratum in clusters possessing a diameter directly proportional to the mass of image silver to be deposited in situ by reduction. Such conformation can be employed to cause image silver to precipitate, in association with the silver precipitation nuclei clusters, with the required density and of a size directly related to the physical parameters of the clusters. The image silver thus precipitated in situ in galaxies of chosen physical parameters provides image conformation in which the element silver of the print-receiving element may possess a very high order of covering power, for example, five to fifteen or more times that of the negative elemental image silver in the silver halide element.

As disclosed in U.S. Pat. Nos. 2,726,154; 2,861,885 and 2,944,894 desirable composite prints comprising both negative and positive images in superposition may be provided by simplified silver diffusion transfer reversal processes employing a photosensitive silver halide emulsion which upon full development of its exposed areas, as a function of exposure, provides a relatively low maximum density negative silver image with relation to the high maximum density positive silver image provided by a silver-precipitating environment of the type detailed above. In a composite print produced in accordance with the disclosure of the second cited patent, the covering power of a given mass of image silver in the print-receiving element is there stated to range from 14 to 15 times that of an equal mass of image silver in the silver halide element and, accordingly, for transparency employment a maximum negative density of as high as 1.0 density units may be permissible where the maximum positive density is about four or more times as great.

In accordance with the present invention, however, it has now been quite unexpectedly discovered that distinctly advantageous results may be achieved in the production of silver image formation, as a function of photosensitive silver halide stratum exposure, by the employment of a film unit assemblage which comprises a permanently fixed laminate which includes a color screen carrying on one surface, in order, a first layer comprising silver-precipitating nuclei, a layer comprising photosensitive silver halide crystals, and a second layer comprising silver precipitating nuclei.

The silver-precipitating nuclei are present in a concentration effective to provide a silver image to the film unit possessing optical density inversely proportional to exposure of photosensitive silver halide layer and, specifically, in a concentration adapted to provide a silver image derived from unexposed silver halide crystals possessing greater covering power than that of a corresponding silver image derived from an identical quantum of exposed silver halide crystals.

In particular, it has been unexpectedly discovered that improved color reproduction in accordance with the previously discussed principles of additive color photography maybe obtained by means of the improved silver image characteristics provided by reason of the present invention. Specifically, it has now been found that composite negative/positive silver image formation, particularly adapted for additive color reproduction and possessing an optical density inversely proportional to photoexposure of a photosensitive silver halide layer, characterized by improved silver image minimum and maximum optical densities and image acuity may be achieved by a process which includes exposing a photographic film unit, which comprises a permanent laminate containing a color screen carrying on one surface at least two separate and discrete layers containing silver-precipitating nuclei and a photosensitive silver halide layer positioned intermediate two silver-precipitating nuclei containing layers, wherein the exposure of the emulsion is effected by radiation traversing through the color screen and the processing of the film unit is accomplished by contact, simultaneous with, or subsequent to, exposure, with an aqueous processing composition, containing a silver halide-developing agent and a silver halide solvent, to provide to the film unit the direct formation of a silver image possessing particularly desired low minimum silver image optical density, in terms of exposed areas of the film unit, and high maximum silver image optical density, in terms of unexposed areas of the film unit, as a function of exposure and development of the film unit. There is thus provided and the present invention is, accordingly, specifically directed to a film unit assemblage structure which is permanently fixed laminate and comprises a color screen carrying, in order on one surface, a first silver-precipitating nuclei containing layer, a photosensitive silver halide layer, and a second silver-precipitating nuclei containing layer.

As stated, the silver-precipitating nuclei present in the film unit are disposed in a concentration effective to provide a silver image possessing an optical density inversely proportional to exposure of the emulsion and in effect provide a silver image derived from unexposed silver halide crystals possessing greater covering power than a silver image derived from exposed silver halide crystals, by reason of the fact that the image silver derived from unexposed silver halide crystals comprises silver of a first physical character and image silver derived from exposed silver halide crystals comprises silver of a second physical character and that the first physical character silver possesses higher optical density than the second physical character silver per unit mass.

It has been specifically found that in the preferred embodiments of the present invention, the film unit is particularly fabricated as specifically detailed herein to provide a differential $\rightleftharpoons \sim 1.0$ and specifically $\rightleftharpoons \sim 1.5$ density units between the predetermined maximum image density of the developed negative silver image, i.e., $D_{min}$, and the predetermined minimum image density of developed positive silver, i.e., $D_{max}$. In a particularly preferred embodiment, the film unit is fabricated to provide a maximum silver image density $\rightleftharpoons \sim 0.5$ and, more particularly $\rightleftharpoons \sim 0.3$ density units upon development of completely exposed areas of the emulsion and the film unit will possess silver precipitating nuclei in a concentration effective to provide a minimum image density $\rightleftharpoons \sim 1.0$ and specifically $\rightleftharpoons \sim 1.8$, preferably, in excess of $\sim 2.0$ and, most preferably, $\sim 3.0$ density units derived from processing of unexposed silver halide grains. In such preferred embodiment, the silver halide stratum will ordinarily comprise panchromatically sensitized silver chloroiodobromide or silver iodobromide, particularly that containing 1 to 9 percent iodide by weight of silver, dispersed in a permeable colloidal binder which, in a preferred embodiment comprises gelatin sufficiently hardened to provide a hydration factor, upon contact of aqueous processing composition preferably possessing a pH in excess of $\sim 12$, effective to prevent swelling in excess of a magnitude equal to its ambient size within a period of $\leftarrow \sim 15$ seconds.

In accordance with the unexpected discovery which constitutes the present invention, the presence of silver-precipitating nuclei contiguous both major surfaces of a photosensitive silver halide layer during processing effectively acts to facilitate advantageous production of a silver image inversely proportional to exposure of the silver halide layer by geometrically maximizing the effective concentration of nuclei next adjacent the photosensitive layer so that there is provided, in comparison with the structures of the prior art, decreased transport time and distance to ultimate image disposition of reduced soluble silver complex, derived from unexposed silver halides and constituting the ultimate image constituents. Such decreased transport time and distance as is achieved decreases lateral diffusion or deviation of image components and thereby provides the increased image acuity and resolution required for most effective color reproduction employing color screen techniques. In addition, it has also been further discovered that the resultant geometric maximization of effective silver-precipitating nuclei concentration in adjacent spacial relationship to both major surfaces of the silver halide crystal containing layer enhances, to a maximum extent, image silver mordant sink capacity and, accordingly, efficiency, information content and acuity of the resultant silver image formation. The close spacial proximity of silver-precipitating nuclei next adjacent the major surface boundaries of the photosensitive layer in effect provides silver-precipitating nuclei substantially contiguous the silver halide crystals of the relatively thin, e.g., $\simeq$1 micron, photosensitive layer and has been found to substantially obviate, when compared with prior art film unit structures, substantial "fiber" or "filamentary"silver image formation, during processing, as a function of the chemical development of exposed silver halide crystals, and the thereby resultant increased covering power derived from such image silver conformation.

In general, in accordance with the teachings of the photographic art, "physically" developed silver is directly reduced from a fluid phase during development and essentially comprises relatively compact grains. In contradistinction, "chemically" developed silver, in all known conventional processes, is directly furnished from exposed silver halide crystals and essentially includes image silver in the general form of "fibers" or "filaments." The covering power, that is, the optical density per gram of silver per square meter, of the resultant silver image, in each instance, is a function of the aggregation and conformation of developed silver and, in general, may be considered to be inversely proportional to the diameter of the particles, or gains as aggregated, in the absence of considerations with respect to aggregate conformation.

In accordance with the present invention, however, a film unit assemblage may be fabricated, as detailed above, to provide as a function of exposure, upon development in the presence of silver halide solvent, silver image conformation, derived from development of photoexposed silver halide crystals, restricted to a major extent to elemental silver grains or particles possessing a diameter substantially equal to the original diameter of the unexposed photosensitive crystals constituting the silver halide stratum. The negative image silver is thus characterized by decreased "fiber" or "filamentary" conformation when compared with prior art type film unit structures. Amplification of the thus produced negative silver image, to provide an optical density beyond that provided by elemental silver image particles or grains of a diameter directly comparable to the silver halide stratum crystal diameters and resultant from increased image grain diameter pursuant to crystal area growth, directly or by reason of elemental silver "fiber" or "filament" production, is effectively prevented to a substantial magnitude.

Photosensitive silver halide emulsions of the "high speed" type generally employed for photographic reproduction are characterized by the presence of photoresponsive silver halide crystals possessing active sensitivity centers or sites which are believed to comprise minute aggregates of silver sulfide, the sulfide of which is derived from active sulfur naturally present initially in a polymeric matrix, for example, a gelatin matrix, or added to the formulation during fabrication. For optimum sensitivity there should be a limited but effective number of sensitivity sites in each crystal, particularly at the surface of the crystals. Upon exposure to incident electromagnetic radiation actinic to the crystals, it is understood that photons absorbed by the crystals provide photoelectrons within the crystals which are capable of diffusion to the sensitivity sites which possess a lower conductivity bond level and, in effect, provide such sites with a negative charge which precipitates, at the sites, as elemental silver, free silver ions originally disposed within the crystal lattice. During development of the exposed silver halide crystals, the silver halide-developing agent, a reducing agent, provides additional electrons which serve to effect precipitation of additional silver ion of the crystals resulting in the extrusion of fibrous or filamentary elemental silver at surface sensitivity sites and which continues until reduction of the crystals is complete.

The presence of an effective concentration of silver-precipitating nuclei contiguous both surfaces of the thin silver halide layer during the development process effectively acts to facilitate prevention of microscopic elemental silver filament or fiber extrusion beyond the crystal surface of the concomitant result of restricting image grain size to that of the crystal. Accordingly, the covering power of the resultant negative image in each instance is limited to that provided by elemental silver grains or particles possessing a diameter substantially equal to that of the original crystals dispersed in the photosensitive matrix and absent amplification due to the diameter increase of conventional negative image elements resultant from filamentary image silver.

There is thus provided by means of the present invention photosensitive silver halide crystals or grains dispersed in an environment containing silver-precipitating nuclei or agents which in the presence of a solvent developer composition cause exposed grains to be reduced to opaque structures smaller in the present area than the area of the same grains developed in an identical developer composition absent such precipitating nuclei. Silver image masses derived from exposed silver halide grains developed in accordance with the present invention, accordingly, possess low optical covering power as compared with the covering power provided by identical grains developed in the same solvent developer absent the presence of the precipitating environment. Specifically, the present invention provides for the production of a direct positive silver image in which the transmissivity of silver image is a function of the quantity of actinic radiation which exposed the photosensitive silver halide. The exposed silver halide grains are reduced as compact masses possessing low-covering power simultaneously with reduction of unexposed silver halide grains as colloidal dispersions possessing high covering power. The direct positive silver image thus produced in situ by means of the present invention possesses extraordinary high sharpness when compared with the silver transfer processes of the prior prior art.

For the purpose of insuring the production of a positive image possessing a high covering power, the silver precipitation nuclei will be disposed within the film unit in a concentration per unit area effective to cause image silver derived from unexposed silver halide crystals to possess the desired opacity per given mass of in situ reduced silver.

It will be specifically recognized, however, that in a preferred embodiment of the invention the photoinsensitive silver-precipitating nuclei containing layer should most preferably possess a thickness of less than about a wavelength of light so that for all practical optical purposes the photosensitive silver halide emulsion layer will be effectively located next adjacent the color screen whereby minimizing to a maximum extent any possible optical parallex problems during radiation transmission, as well as any substantial lateral diffusion of silver image-forming components during processing of the film unit.

Referring to the figure, there is shown a diagrammatic enlarged cross-sectional view of a film unit constructed in accordance with a preferred embodiment of the present invention. The film unit is shown to specifically comprise a flexible transparent film base or support member 10 carrying on one surface, in order, an additive color screen 11 comprising a geometrically repetitive plurality of actinic radiation-filtering colored elements including a set or group of primary red-colored filter elements, a set of primary blue-colored filter elements and a set of primary green-colored filter elements arranged in a repetitive distribution in side-by-side relationship in a substantially single plane; a first substantially photoinsensitive layer 12 comprising silver-precipitating nuclei; a photosensitive silver halide emulsion 13; and a second substantially photoinsensitive layer 12 comprising silver precipitating nuclei.

The photoresponsive material of photographic emulsion 13 will, as previously described, preferably comprise a crystal of a compound of silver, for example, one or more of the silver halides, such as photosensitive silver chloride, silver iodide, silver bromide, or most preferably, mixed silver halides, such as silver chlorobromide, silver chloroiodobromide or silver iodobromide, of varying halides ratios and the silver concentrations previously identified most preferably dispersed in a processing composition permeable binder material.

In general, silver-precipitating nuclei comprise a specific class of adjuncts well known in the art as adapted to effect catalytic reduction of solubilized silver halide specifically including heavy metals and heavy metal compounds such as the metals of Groups IB, IIB, IVA, VIA, and VIII and the reaction products of Groups IB, IIB, IVA, and VIII metals with elements of Groups VIA, and may be effectively employed in the conventional concentrations traditionally employed in the art, preferably in a relatively low concentration in the order of about $1-25 \times 10^{16}$ moles/ft.$^2$.

Especially suitable as silver-precipitating agents are those disclosed in U.S. Pat. No. 2,698,237 and specifically the metallic sulfides and selenides, there detailed, these terms being understood to include the selenosulfides, the polysulfides, and the polyselenides. Preferred in this group are the so-called "heavy metal sulfides." For best results it is preferred to employ sulfides whose solubility products in an aqueous medium at approximately 20° C. vary between $10^{123}$ and $10^{130}$, and especially the salts of zinc, copper, cadmium and lead. Also particularly suitable as precipitating agents are heavy metals such as silver, gold, platinum and palladium and in this category the noble metals illustrated are preferred and are generally provided in the matrix as colloidal particles.

The preferred silver halide type photographic emulsion 13, employed for the fabrication of the photographic film unit, may be prepared by reacting a water-soluble silver halide, such as ammonium, potassium or sodium bromide, preferably together with a corresponding iodide, in an aqueous solution of a peptizing agent such as colloidal gelatin solution; digesting the dispersion at an elevated temperature, to provide increased crystal growth; washing the resultant dispersion to remove undesirable reaction products and residual water-soluble salts, for example, employing the preferred gelatin matrix material, by chilling the dispersion, noodling the set dispersion, and washing the noodles with cold water, or, alternatively, employing any of the various floc systems, or procedures, adapted to effect removal of undesired components, for example, the procedures described in U.S. Pat. Nos. 2,614,928; 2,614,929; 2,728,662, and the like; after ripening the dispersion at an elevated temperature in combination with the addition of gelatin or such other polymeric material as may be desired and various adjuncts, for example, chemical sensitizing agents and the like; all according to the traditional procedures of the art, as described in Neblette, C. B., *Photography—Its Materials and Processes*, sixth Ed., 1962.

Optical sensitization and preferably panchromatic sensitization of the emulsion's silver halide crystals may then be accomplished by contact with optical sensitizing dye or dyes; all according to the traditional procedures of the art, or described in Hamer, F. M., *The Cyanine Dyes and Related Compounds*.

Subsequent to optical sensitization, any further desired additives, such as coating aids and the like, may be incorporated in the emulsion and the mixture coated on color screen 11 according to the conventional photographic emulsion coating procedures known in the art.

As the binder for the photoresponsive material, the aforementioned gelatin may be, in whole or in part, replaced with some other natural and/or synthetic processing composition permeable polymeric material such as albumin; casein; or zein or resins such as cellulose derivative, as described in U.S. Pat. Nos. 2,322,085 and 2,541,474; vinyl polymers such as described in an extensive multiplicity of readily available U.S. and foreign patents or the photoresponsive material may be present substantially free of interstitial binding agent as described in U.S. Pat. Nos. 2,945,771; 3,145,566; 3,142,567; Newman, *Comment on NonGelatin Film*, B. J. O. P., 534, Sept. 15, 1961; and Belgian Pat. Nos. 642,557 and 642,558.

The discrete silver-precipitating nuclei layer or layers 12 may be realized by the application of, location of, and/or in situ generation of, the nuclei directly or indirectly contiguous one or both surfaces of the photosensitive layer in the presence or absence of binder or matrix material and, in the latter instance, may comprise one or more adjacent or separated strata of a permeable material contiguous either or both surfaces containing one or more nuclei types disposed in one or more such layers. Matrix materials adapted for such employment may comprise both inorganic and organic materials, the latter type preferably comprising natural or synthetic, processing composition permeable, polymeric materials such as protein materials, for example, glues, gelatins, caseins, etc.; carbohydrate materials, for example, chitins, gums, starches, alginates, etc.; synthetic polymeric materials, for example, of the vinyl or cellulosic types such as vinyl alcohols, amides and acrylamides, regenerated celluloses and cellulose ethers and esters, polyamides and esters, etc., and the like; and the former type preferably comprising submacroscopic agglomerates of minute particles of a water-insoluble, inorganic, preferably siliceous material such, for example, as silica aerogel as disclosed in U.S. Pat. No. 2,698,237.

Where the silver-precipitating agent is one or more of the heavy metal sulfides or selenides, it may be preferable to prevent the diffusion and wandering of the sulfide or selenide ions, as the case may be, by also including, in the silver-precipitating layers or in separate layers closely adjacent thereto, at least one metallic salt which is substantially more soluble in the processing agent than the heavy metal sulfide or selenide used as the silver-precipitating agent and which is irreducible in the processing agent. This more soluble salt has, as its cation, a metal whose ion forms sulfides or selenides which are difficulty soluble in the processing agent and which give up their sulfide or selenide ions to silver by displacement. Accordingly, in the presence of sulfide or selenide ions the metal ions of the more soluble salts have the effect of immediately precipitating the sulfide or selenide ions from solution. These more soluble or ion-capturing salts may be soluble salts of any of the following metals: cadmium, cerium (ous), cobalt (ous), iron, lead, nickel, manganese, thorium, and tin. Satisfactory soluble and stable salts of the above metals may be found, for example, among the following groups of salts: the acetates, the nitrates, the borates, the chlorides, the sulfates, the hydroxides, the formates, the citrates and the dithionates. The acetates and nitrates of zinc, cadmium, nickel, and lead are preferred. In general, it is also preferably to use the white or lightly colored salts although for certain special purposes the more darkly colored salts may be employed.

The previously mentioned ion-capturing salts may also serve a function of improving the stability of the positive image provided they possess, in addition to the aforementioned characteristics, the requisites specified in U.S. Pat. No. 2,584,030. For example, if the ion-capturing salt is a salt of a metal which slowly forms insoluble or slightly soluble metallic hydroxides with the hydroxyl ions in the alkaline processing liquid, it will suitably control the alkalinity of the film unit to substantially, if not totally, prevent the formation of undesirable developer stains.

In accordance with a particularly preferred embodiment of the present invention, photosensitive and image-receiving strata carrying the image silver is fabricated to substantially prevent microscopic distortion of the image conformation by preventing microscopic migration or diffusion of image elements within the polymeric matrix. In general, conventional photographic image elements may ordinarily comprise a microscopically dynamic system without seriously noticeable disadvantage to the conventional employment of the image. However, the particularly accurate color reproduction in accordance with the principles of additive color photography, microscopic distortion of image elements is preferably obviated to insure maximization of the accuracy of image registration with the appropriate individual optical filter elements of the additive color screen associated with the image-carrying element. Specifically, it has been found that a photosensitive film unit comprising photosensitive emulsion containing silver halide crystals dispersed in a polymeric binder and a photoinsensitive image-receiving layer containing silver-precipitating nuclei dispersed in a polymeric binder, the binders of which possess a lattice effective to substantially prevent microscopic migration or diffusion of image silver, provide color reproduction acuity particularly desired for effective color reproduction in the manner previously described.

The desired polymeric binder lattice property may be readily achieved by selection of a polymeric material possessing the property of sufficiently fixing spacially image components, or a polymeric material, otherwise desired, may be modified, for example, by cross-linking and/or hardening, to the extent necessary to provide the desired spacial maintenance of image components, that is, a rigidity effective to maintain positive image components in registration with the individual optical filter elements of the color screen through which the photosensitive emulsion was exposed. For example, a preferred polymeric binder material, that is, gelatin, may be hardened by contact with conventional hardening agents to the extent necessary to provide the desired rigidification of the photographic image. Where desired, discrete particulate materials facilitating increased processing composition penetration of the photosensitive element, without deleterious effect on the polymeric matrix's lattice, may be advantageously incorporated in the photosensitive element for the purpose of expediting processing of the element.

Production of color screen 11, in accordance with the art, may be classified into two major groups.

First, color screens may be prepared by totally mechanical means, as for example, by printing or ruling a dyeable substrate, for example, with a greasy ink formulation, in accordance with the desired filter pattern; subjecting the substrate to suitable coloration, in areas which do not possess the repellent ink mask; effecting removal of the mask; and repeating this procedure, in accordance with the geometrical pattern of filter elements desired, a sufficient number of times to provide the desired multiplicity of diversely colored filter elements.

A second mechanical method comprises directly printing a carrier substrate with the desired dye formulations in accordance with the predetermined filter pattern and repeating this printing procedure a sufficient number of times to provide the multiplicity of colored filter elements as desired.

A third mechanical method comprises depositing, as an irregular filter screen pattern, a thin layer comprising a random distribution of small grains, which have been independently colored with the colors desired for optical filtering effects.

The second major type of color screen production procedures comprises photomechanical methods of the type initially proposed by, for example, Ducos Du Hauron in the 19th century. These procedures comprise, in general, coating a suitable support or film base with an adhesive composition having coated thereon a photosensitive colloid composition, as for example, dichromated gelatin; effecting exposure of the sensitive gelatin layer by incident actinic radiation, through a suitable mask which provides an exposure pattern devised in accordance with the desired optical filter element arrangement; effecting differential hardening of the sensitized material as a function of the point-to-point degree of exposure; removing unexposed unhardened material by solvent contact; and then subjecting the remaining hardened material to a suitable dyeing procedure in order to provide a first-colored optical filter element series. This procedure is then repeated, employing appropriate masks, as often as necessary to provide the number of optical filter element types desired in the final color screen element.

Because mechanical methods of producing color screen by mechanical printing or ruling methods inherently require a great number of mechanically exact printing steps to provide a finished product, and thus possess the relative high cost inevitable to such complexity of production, and methods of mechanically producing mosaic type color screen elements have, in general, provided elements inherently lacking in color balance, due to areas possessing a predominance of particles of one color, that is, statistical clumping, as a practical result of attempted random distribution, and require the employment of extremely fine-colored gains in order that formation of random aggregates of the same color may be decreased, which, however, gives rise to the additional disadvantage that the thus-prepared units then require very fine grain photographic emulsions and are thus restricted to employment in low speed photographic processes, experience has determined that photomechanical methods of color screen production are to be preferred, especially for high volume, low cost manufacturing operations for production of screen of commercially significant optical acuity.

Although color screen may be produced by traditional contact printing or projection type photomechanical processes a particularly preferred process for the production of color screen comprises the process set forth in U.S. Pat. No. 3,284,208 which includes, in essence, successively coating the smooth surface of a lenticular film with a plurality of photoresponsive layers and sequentially subjecting the coatings to selectively displaced radiation incident on, and focused by, the lenticules receiving same, in order to provide selective exposure of the coating. Subsequent to each exposure, unexposed coating is removed and the resultant resist dyed in order to provide a series of chromatic filter elements, prior to the deposition of the next succeeding photoresponsive layer. Each such exposure is derived from electromagnetic radiation incident on the lenticular film at an angular displacement specifically adapted to provide the desired plurality of chromatic filter element series in substantial side-by-side or screen relationship and adapted to filter predetermined wavelengths of light.

The line depth exposure of the photoresponsive layers maybe accurately controlled by suitably varying the intensity or time of the incident radiation and the color screen produced may be continuous or discontinuous and, in the former instance, may comprise an endless or seamless element.

For the preparation of the preferred trichromatic additive screens, the exposed area of each photoresponsive area will generally comprise about one-third of the layer contiguous each lenticule receiving exposing radiation. Although all three exposures may be accomplished by radiation incident on the lenticules of the lenticular film at three separate angles each adapted to provide exposure about one-third of the area contiguous each lenticule receiving radiation, it will be recognized that the terminal chromatic filter formation may also be provided by exposing the terminal photoresponsive layer to diffuse radiation traversing through the lenticular film and masked by the previously formed chromatic filter elements. Where desired, one or more sets of images resultant from exposure may be overlapped to decrease variation in the width of the exposed areas. While it is not essential that the exposing radiation incident on each lenticule form exactly the same angle of incidence, with respect to the axis of that lenticule, as is formed between radiation incident on other lenticules, and their respective axes, the more identical the correspondence between the angular pattern of incident radiation the greater the facility of registering the respective filter elements and the more uniform the resultant color screen.

At a stage subsequent to formation of the first and second series of filter elements, the lenticular configuration will be constituted as a continuous smooth surface. In the instances where the lenticules comprise a separate stratum temporarily affixed to the surface of a support on which the color screen is formed, such separate stratum may be stripped from the support. Alternatively, where the lenticules comprise an integral component of the film base or support and have been provided to the base by pressure and/or solvent deformation of the base, a continuous smooth surface may be reconstituted by application of suitable solvent and the deformation pressures produced during the manufacturing of lenticular film base released to provide reconstitution of the base's original configuration. Where desired, for example, for optical transmission purposes, the reconstituted surface may be polished, for example, by surface contact with an appropriate rotating polishing cylinder or drum, for the time interval necessary to provide the desired optical characteristics to the film base surface.

Optionally the external surface of the multichromatic screen may be overcoated with a protective polymeric composition, such as nitrocellulose, cellulose acetate, and the like, for the purpose of protecting the screen from processing composition deformation during employment of the resultant film unit. The external surface of the color screen may then have applied thereto silver-precipitating nuclei containing layer 12.

Apparatus particularly adapted to facilitate effecting exposure of the lenticular film in accordance with the aforementioned U.S. Pat. No. 3,284,208 is disclosed and claimed in U.S. Pat. No. 3,318,220.

Support or film base 10 may comprise any of the various types of transparent ridged or flexible supports, for example, glass, polymeric films of both the synthetic type and those derived from naturally occurring products, etc. Especially suitable materials, however, comprise flexible transparent synthetic polymers such as polymethacrylic acid, methyl and ethyl esters; vinyl chloride polymers; polyvinyl acetals; polyamides such as nylon; polyesters such as the polymeric films derived from ethylene glycol terephthalic acid; polymeric cellulose derivatives such as cellulose acetate, triacetate, nitrate, propionate, butyrate, acetate-butyrate, or acetate propionate; polycarbonates; polystyrenes; and the like.

The present invention will be illustrated in greater detail in conjunction with the following specific example with sets forth a representative fabrication of the film units of the present invention, which however, is not limited to the detailed description herein set forth but is intended to be illustrative only.

The smooth surface of a lenticular film comprising a polyester film base having bonded to one surface a cellulose acetate butyrate layer comprising 550 lenticules per inch, each having a planoconvex configuration for condensing the incident radiation into converging rays and having a focal length generally in the order of about 100 microns in air and, as a result of this short focal length, imaging objects over about 1 inch from the lens surface at infinity, may be coated on the opposite surface with an adhesive composition comprising 70 cc. of methanol, 1.25 grams of nitrocellulose, and 30 cc. of butyl alcohol. A first layer of gelatin sensitized by the addition of 15 weight percent potassium dichromate (based on dry gelatin), may then be coated on the external surface of the first adhesive layer. The first gelatin layer may then be exposed to ultraviolet radiation, in accordance with the previously detailed explanation, and the resultant photoexposed carrier subjected to a water wash in order to provide removal of unexposed sensitized gelatin, in accordance with the exposure pattern contained in the first gelatin layer. The web may then be treated with an acid dyeing bath comprising 1.17 percent Direct Red C.I. 81; 0.32 percent Direct Yellow C.I. 4; and 2.95 percent glacial acetic acid, rinsed to effect removal of excess dye, dried and a second adhesive composition containing 70 cc. of methanol, 30 cc. of butyl alcohol, and 1.25 grams of nitrocellulose overcoated thereon. A second layer of gelatin sensitized by the addition of 15 weight percent potassium dichromate may be coated on the second adhesive layer. The second photosensitized gelatin layer may be also exposed to ultraviolet radiation in accordance with the previously detailed description. The second gelatin layer may then be washed with water to effect removal of unexposed photosensitive gelatin, in the manner previously detailed, and the remaining gelatin resist dyed by contact with an acid dyeing bath containing 0.83 percent Acid Green C.I. 7; 0.32 percent Direct Yellow C.I. 4; and 2.86 percent glacial acetic acid. The web may then be rinsed to effect removal of any residual excess dye, dried and coated with a third adhesive composition comprising 30 cc. butanol, 1.25 grams of nitrocellulose, and 70 cc. of methanol. A third layer of gelatin sensitized with 15 weight percent potassium dichromate may then be coated on the external surface of the third adhesive layer and the third photosensitive gelatin layer subjected to exposure by ultraviolet radiation, in accordance with the description detailed previously. The third layer of photosensitive gelatin may the be washed in order to provide the desired resist formation and the resultant resist dyed by contact with a solution containing 1.0 percent Blue T Pina and 1 percent glacial acetic acid, washed to effect removal of residual dye and dried. A protective overcoat layer may be provided by coating the external surface of the multicolor screen element with a composition comprising 70cc. methanol, 30 cc. butanol, and 5 grams of nitrocellulose.

Subsequent to formation of the color screen, the lenticulated cellulose acetate butyrate maybe removed from the polyester base and the external surface of the polymeric protective coating may be coated with a composition comprising deacetylated chitin and copper sulfide at a coverage of 3 mgs./ft.$^2$ deacetylated chitin and 2 mgs./ft.$^2$ copper sulfide. On the external surface of the preceding layer a hardened gelatino silver iodobromide emulsion may then be coated at a coverage of 200 mgs./ft.$^2$ gelatin, 100 mgs./ft.$^2$ silver and 4.0 mgs./ft.$^2$ algin. The resultant film unit may then be overcoated with a layer comprising deacetylated chitin and copper sulfide at a coverage of 6 mgs./ft.$^2$ deacetylated chitin and 4 mgs./ft.$^2$ copper sulfide.

The gelatino silver iodobromide emulsion employed may be prepared by heating a mixture comprising 80 grams of gelatin in 880 grams of water at a temperature of about 40° C. for the period required to dissolve the gelatin. The pH of the resultant solution may be adjusted to 10±0.1 and 8.8 grams of phthalic anhydride in 61.6 cc. of acetone added to the solution over a period of 30 minutes. Subsequent to addition of the phthalic anhydride the reaction mixture may be maintained at the stated temperature and pH for a period of about 30 minutes and then adjusted to a final pH of about 6.0.

To a solution comprising 226 grams of the gelatin phthalic anhydride derivative, prepared as above, 161 grams of potassium bromide, 2 grams of potassium iodide, and 1200 grams of water may be added a solution comprising 200 grams of silver nitrate in 1600 grams of water, at a rate of about 140 cc. per minute, for a period of about 3 minutes, held 10 minutes and the addition continued for a period of about 9 minutes. The resulting emulsion may then be precipitated by reducing the pH to about 2.5-3.0 with sulfuric acid. The precipitate may then be separated from the supernatant liquid and washed until the wash water is essentially free of excess potassium bromide. Ninety-five grams of gelatin may then be added to the precipitate, the volume adjusted with water to 845 cc., and dissolved by heating to about 38° C., for about 20 minutes, at a pH of about 5-6, and about 1.0 cc. of 1 N potassium bromide added to the emulsion. To the reaction mixture, at about 56° C., may be added about 5 cc. of a solution containing 0.1 grams of ammonium thiocyanate in 9.9 cc. of water and 0.4 cc. of a solution containing 0.097 grams of gold chloride in 9.9 cc. of water, and the mixture ripened at that temperature for about 37 hours. The resultant emulsion may then be panchromatically sensitized by the sequential addition of 0.1 percent, by weight, methanol solutions and anhdyro 5,5'-diphenyl-3,3'-bis-(4-sulfobutyl)-9-ethyl-oxacarbocyanine hydroxide and anhydro 5,5'-dimethyl-3,3'-bis-(3-sulfopropyl)-9-ethyl-thiacarbocyanine hydroxide in optionally effective concentrations.

The copper sulfide silver precipitating agent may be provided, prior to coating, by the in situ addition of substantially equimolar quantities of copper acetate and sodium sulfide solutions.

The film unit, fabricated as detailed above, may be subjected to exposing electromagnetic radiation incident on the transparent base and developed by contacting the film unit for about 2 seconds with a processing composition comprising 180 cc. of water, 8.33 grams of sodium hydroxide, 16 grams of sodium thiosulfate, 6.48 grams of sodium sulfite, 0.42 grams of 6-nitrobenzimidazole, and 5 grams of 2,6 -dimethylhydroquinone, to provide production of a positive silver image possessing the optical characteristics described hereinbefore and the acuity required for additive color reproduction.

A film unit fabricated and processed in the general manner detailed above exhibited a $D_{max}$ silver coverage of 96 mgs./ft.$^2$ and a $D_{min}$ silver coverage of 96 mgs./ft.$^2$ and an optical density of 2.80 and 0.31, respectively.

Comparison of a film unit fabricated and processed in the general manner detailed above, verses a film unit fabricated and processed in substantially the same manner with the significant exception that the last-mentioned copper sulfide layer was absent clearly illustrates the unexpectedly improved results provided by means of the present invention. Specifically, a film unit fabricated to be directly comparative with the film unit detailed above and possessing no separate layer containing silver precipitating nuclei overlying the photosensitive silver halide emulsion layer, exhibited a $D_{max}$ silver coverage of 98.4 mgs./ft.$^2$ and a $D_{min}$ silver coverage of 98.4 mgs./ft.$^2$ and an optical density of 2.50 and 0.42, respectively.

Additional film units may be fabricated and processed in the manner detailed above and optimized to exhibit a $D_{max}$ of 3.3 and a $D_{min}$ of 0.3 and to thus provide a differential of 3.0 density units and, in effect, a percent transmission ratio of about 1,000:1, and, desired, for example, by reason of selected color screen parameters, a $D_{max}$ of 4.0 and a $D_{min}$ of 0.3 to provide a differential of 3.7 density units and thus a percent transmission ratio of about 5,000:1.

The film units of the present invention are particularly desirable for employment as a cine film for additive color motion picture projection, in addition to slide transparency film, by reason of the inherent ability to simply and effectively process such film employing relatively simple and stable processing compositions, immediately subsequent to exposure, without the necessity of providing a process and apparatus adapted to effect stripping of a separate emulsion stratum from the remainder of the film unit, to provide color information recordation possessing the image integrity and reproduction characteristics required for effective employment of the film.

As previously stated, the photosensitive silver halide emulsion and/or the silver-precipitating nuclei containing layer may have advantageously incorporated therein discrete particulate materials providing increased porosity to the film unit, without deleterious effect on the dimensional stability of the binder lattice, in particular, those materials which additionally act as an antiswelling agent for the emulsion's binder material and, accordingly, act to facilitate the prevention of the carried image's microscopic distortion, particularly, with respect to an associated color screen, such as discrete silica particles dispersed, for example, in a concentration of about 0.3 to 1.5 silica per part binder, for the purpose of facilitating processing composition permeation of the film unit's emulsion and silver precipitating nuclei containing layers. In addition, the silver-precipitating nuclei containing stratum distal the color screen may be advantageously overcoated with a processing composition permeable polymeric material such as hardened gelatin pad or the like to advantageously promote uniformity in processing composition permeation of such stratum, by modulating any wave front resultant from initial surface contact with the liquid employed and to thereby promote uniform maintenance of the polymeric binder's physical characteristics.

Although chrome alum and particularly algin have been advantageously employed as hardening agents for the polymeric gelatin emulsion binder, it will be recognized that substantially any hardening or cross-linking agent may be employed, where necessary with respect to any one or more layers of the film unit, which does not provide deleterious photographic effects, to the extent required to provide a binder lattice which effectively inhibits to a substantial effect, migration of image silver. An extensive collection of hardening agents are disclosed in the art as specifically adapted to effect hardening or cross-linking of photographic polymeric binder material compositions and by reason of their innocuous photographic effects are to be preferred in the practice of the present invention. The sole requirement for effective operation of the film unit is that the emulsion's polymeric lattice be constructed to provide the optical image parameters denoted hereinbefore. Thus, substantially any conventional hardening and cross-linking agent may be selected from those set forth throughout, for example, the pertinent patent literature regarding such agents, and the concentration employed, as known in the art, will be dependent upon the relative activity of the selected agent, or agents, and the relative amount of hardening or cross-linking to be effected. The specific concentration of a selective hardening or cross-linking agent, to be contacted with a selected polymeric binder, may be readily determined empirically, within the specific context of ultimate photographic employment, by screening. It will be further recognized that any of the various processing composition permeable, synthetic or natural polymeric materials, possessing the physical characteristics required to provide the results denoted above, may be substituted in replacement of the specifically illustrated polymeric materials provided that such selected polymer provides a matrix which is not deleterious to photosensitive silver halide crystals and possesses a lattice allowing processing in the manner previously described.

Suitable silver halide solvents for employment in the practice of the present invention include conventional fixing agents such as the previously noted sodium thiosulfate, sodium thiocyanate, ammonium thiocyanate, the additional agents described in U.S. Pat. No. 2,543,181, and the associations of cyclic imides and nitrogenous bases such as associations of barbiturates or uracils and ammonia or amines and other associations described in U.S. Pat. No. 2,857,274.

Where desired conventional silver-toning agent or agents may be disposed within the emulsion composition in a concentration effective to provide a positive image toned in accordance with the desires of the operator.

In the preferred embodiment of the present invention, the processing composition will include an alkaline material, for example, sodium hydroxide, potassium hydroxide or sodium carbonate, or the like, and most preferably in a concentration providing a pH to the processing composition in excess of about 12. The processing composition may, where desired, contain the sole silver halide developing-agent or agents employed, or a silver halide-developing agent in addition to that disposed within the film unit; however, disposition of one or more developing agents in the emulsion and/or a permeable layer directly associated therewith, intermediate the emulsion and a color screen, is a particularly preferred embodiment, for the purpose of providing unexposed image acuity, which more readily facilitates directly initiated development at radiation exposed areas of the emulsion without the necessity of diffusing such agents to such sites by means of the processing composition selected.

It will be apparent that the relative proportions of the agents comprising the developing composition set forth herein may be altered to suit the requirements of the operator. Thus, it is within the scope of this invention to modify the herein described developing compositions by the situation of preservatives, alkalis, silver halide solvents, etc., other than those specifically mentioned. When desirable, it is also contemplated to include, in the developing composition, components such as restrainers, accelerators, etc. The concentration of such agents may be varied over a relatively wide range commensurate with the art.

The processing composition solvent employed, however, will generally comprise water and will possess a solvent capacity which does not deleteriously hydrate the selected binder lattices beyond that required to provide the preferred image formation. Accordingly, no adjunct should be included within such composition which deleteriously effects the lattice parameters required for such image formation.

In the description herein, each color series of filter elements has been described as covering that part of the total area in proportion to the total number of colors used, i.e., in the tricolor system each color occupies one-third of the total area. This may vary quite widely before having a noticeable effect to the observer and, in fact, may be compensated by changing the intensity of the colors. In actual practice, if one dye is of greater intensity than the others, a deliberate compensation may be made by a reducing the total relative area of the intense color. The aspect of relative areas is well known in the art so that when relative areas are used in this application, it is intended to include the variances which the art would recognize as being successful.

Various colors and numbers of colors may be used in this invention but the preferred system, as previously mentioned, is a tricolor arrangement of the three primary colors, red, green and blue.

It will be recognized, however, that, in accordance with the instant disclosure, a plurality of chromatic filter element series may be provided, the number of series being solely determined by the optical parameters of the resultant color screen desired.

For example, a four-color system such as red, green, violet-blue and orange-yellow could also be effectively employed in accordance with the teachings of the instant disclosure.

In the practice of the present invention, additive trichromatic color screens possessing 550, 756 and 1100 lines/color/inch may be readily employed and it has been found that image resolution obtained by means of the present invention exceeds that obtainable in prior art processes which require substantially complete transfer of image-forming components to a single image-carrying layer contiguous the color screen. Such increased resolution specifically facilitates the acuity of color reproduction to be achieved by the practice of the invention.

In general, the silver halide emulsion will preferably contain the minimal grain size distribution commensurate with the process speed desired for selected employment of film unit fabricated in order to maximize the average number of grains located behind anyone optical filter element and to further maximize the resolution achieved by the film unit's construction. The emulsion will also preferably be panchromatically sensitized to provide equal image production, as a direct function of incident exposing radiation, throughout the response portion of the radiation spectrum to further enhance the acuity of color information recordation by the emulsion.

In addition to the described essential layers, it will be recognized that the film unit may also contain one or more subcoats or layers, which, in turn, may contain one or more additives such as plasticizers, intermediate essential layers for the purpose, for example, of enhancing adhesion, and that one or more of the described layers may comprise a composite of two or more strata which may be contiguous or separated from each other.

Since certain changes may be made in the above product, process and apparatus without departing from the scope of the invention herein involved, it is intended that all matter contained in the above description shall be interpreted as illustrative and not in a limiting sense.

What I claim is:

1. A photographic film unit which comprises a permanent laminate including a color screen carrying on one surface, in order, a first layer comprising silver-precipitating nuclei, a layer comprising photosensitive silver halide crystals and a second layer comprising silver-precipitating nuclei.

2. A photographic film unit as defined in claim 1 wherein said silver-precipitating nuclei are present in a concentration effective to provide a silver image possessing optical density inversely proportional to exposure of the photosensitive silver halide layer.

3. A photographic film unit as defined in claim 2 wherein said silver-precipitating nuclei are present in a concentration effective to provide a silver image derived from unexposed silver halide crystals possessing greater covering power than a silver image derived from exposed silver halide crystals.

4. A photographic film unit as defined in claim 3 wherein said silver image derived from unexposed silver halide crystals comprises silver of a first physical character and said silver image derived from exposed silver halide crystals comprises silver of a second physical character, said first physical character silver possessing higher optical density than said second physical character silver per unit mass.

5. A photographic film unit as defined in claim 4 which comprises a permanent fixed laminated including a transparent support carrying on one surface, in order, a color screen, a layer comprising silver-precipitating nuclei, a photosensitive silver halide emulsion layer comprising, dispersed in a processing composition permeable polymeric binder, photosensitive silver halide crystals, and a layer comprising silver-precipitating nuclei, said silver-precipitating nuclei present in a concentration effective to provide upon development in the presence of a silver halide solvent, as a function of exposure, a silver image comprising said first and said second physical character silver.

6. A photographic film unit as defined in claim 3 which is a permanently fixed laminate and comprises a transparent support carrying on one surface, in order, a color screen, a substantially photoinsensitive layer comprising silver-precipitating nuclei, a photosensitive silver halide emulsion layer comprising photosensitive silver halide crystals and a substantially photoinsensitive layer comprising silver-precipitating nuclei, said silver-precipitating nuclei present in a concentration effective to provide upon development in the presence of a silver halide solvent, as a function of exposure, a silver image derived from development of exposed silver halide crystals possessing a maximum image density at least 1.0 density units less than the maximum density of a silver image derived from development of unexposed silver halide crystals.

7. A photographic film unit as defined in claim 6 which is a permanently fixed laminate and comprises a transparent flexible polymeric support carrying on one surface, in order, a multicolor screen, a substantially photoinsensitive layer comprising silver-precipitating nuclei dispersed in a processing composition permeable binder, a photosensitive silver halide emulsion comprising photosensitive silver halide crystals dispersed in a processing composition permeable binder, and a substantially photoinsensitive layer comprising silver-precipitating nuclei dispersed in a processing composition permeable binder, said processing composition permeable binders effective to substantially prevent microscopic distortion of image components in registration with individual color screen optical filter elements through which the photosensitive emulsion was exposed, said silver-precipitating nuclei present in a concentration effective to provide upon development in the presence of a silver halide solvent, as a function of exposure of the unit to actinic radiation, a minimum image density not in excess of about 0.5 and a maximum image density of not less than about 1.5.

8. A photographic film unit as defined in claim 5 wherein said permeable polymeric binder comprises gelatin.

9. A photographic film unit as defined in claim 8 wherein said gelatin binder contains dispersed therein silica.

10. A photographic film unit as defined in claim 9 wherein said silica is present in a concentration of about 0.3 to 1.5 parts silica per part gelatin.

11. A photographic film unit as defined in claim 7 wherein said permeable binder of at least one of said photoinsensitive layers comprises deacetylated chitin.

12. A photographic film unit as defined in claim 1 including a separate processing composition permeable polymeric layer containing a silver halide-developing agent positioned intermediate said color screen and said photosensitive silver halide emulsion.

13. A photographic film unit as defined in claim 1 wherein said color screen comprises an additive color screen.

14. A photographic film unit as defined in claim 1 wherein said silver-precipitating nuclei are present in a concentration of about $1-25 \times 10^{16}$ moles/ft.$^2$.

15. A photographic film unit as defined in claim 1 wherein said silver-precipitating nuclei comprises metallic sulfides, metallic selenides or colloidal noble metals.

16. A photographic film unit as defined in claim 1 wherein said silver halide crystals comprise silver iodobromide crystals.

17. A photographic film unit as defined in claim 16 wherein said silver iodobromide crystals comprise about 1 to 9 percent by weight, iodide.

18. A photographic film unit as defined in claim 1 wherein said photosensitive silver halide crystals are panchromatically sensitized.

19. A photographic film unit as defined in claim 18 wherein said color screen is a tricolor additive screen.

20. A photographic film unit as defined in claim 19 wherein said additive tricolor screen comprises red, green and blue colored optical filter elements.

21. A photographic film unit as defined in claim 20 which is a permanent fixed laminate and comprises a transparent flexible polymeric support carrying on one surface, in order, a plurality of layers including a trichromatic additive color screen comprising red, green and blue color optical filter elements; a substantially photoinsensitive layer comprising silver precipitating nuclei dispersed in a processing composition permeable polymeric binder; a photosensitive silver halide emulsion comprising panchromatically sensitized silver iodobromide crystals dispersed in a gelatin binder; a substantially photoinsensitive layer comprising silver-precipitating nuclei dispersed in a processing composition permeable polymeric binder; said silver-precipitating nuclei comprising metallic sulfide, metallic selenide or colloidal noble metal silver-precipitating nuclei present in a concentration effective to provide upon development of exposed silver iodobromide crystals in the presence of a silver halide solvent, as a function of the point-to-point degree of exposure to actinic radiation, a maximum silver image density not in excess of about 0.3 and a maximum silver image density of developed silver derived from unexposed silver halide crystals of not less than about 1.8.

22. A photographic process which comprises, in combination, the steps of exposing a photographic film unit comprising a permanent laminate which contains a color screen, in order, a first layer comprising silver precipitating nuclei; a layer comprising a photosensitive silver halide; and a second layer comprising silver-precipitating nuclei, through said color screen, contacting said exposed silver halide layer with an aqueous processing composition containing a silver halide-devleoping agent and a silver halide solvent thereby providing a visible silver image to said film unit in terms of the unexposed areas of said silver halide layer as the function of the point-to-point degree of exposure thereof, and maintaining said laminate intact subsequent to processing.

23. A photographic process as defined in claim 22 which comprises, in combination, the steps of exposing a photographic film unit which comprises a permanent fixed laminate including a transparent support carrying on one surface, in order, a color screen, a layer comprising silver-precipitating nuclei, a photosensitive silver halide emulsion comprising photosensitive silver halide crystals dispersed in a processing composition permeable polymeric binder, and a layer comprising silver precipitating nuclei, said silver-precipitating nuclei present in a concentration effective to provide a silver image possessing optical density inversely proportional to exposure of the emulsion, through said screen, contacting said silver halide emulsion with an aqueous processing composition containing a silver halide-developing agent and a silver halide solvent to provide a visible silver image to said emulsion possessing optical density inversely proportional to exposure of the emulsion, and maintaining said laminate intact subsequent to processing.

24. A photographic process as defined in claim 23 which comprises in combination, the steps of exposing a photographic film unit comprising a permanent laminate containing a transparent support carrying on one surface, in order, a color screen, a first substantially photoinsensitive layer comprising silver-precipitating nuclei, a photosensitive silver halide emulsion comprising photosensitive silver halide crystals dispersed in a processing composition permeable polymeric binder, and a second substantially photoinsensitive layer comprising silver-precipitating nuclei, said silver-precipitating nuclei present in a concentration effective to provide a silver image derived from unexposed silver halide crystals possessing greater covering power than a silver image derived from exposed silver halide crystals, through said screen, contacting said silver halide emulsion with an aqueous processing composition containing a silver halide-developing agent and a silver halide solvent for a period of time effective to provide a visible silver image to said film unit, as a function of emulsion exposure, derived from unexposed silver halide crystals possessing greater covering power than the silver image derived from exposed silver halide crystals, and maintaining said laminate intact subsequent to processing.

25. A photographic process as defined in claim 24 wherein said silver image derived from unexposed silver halide crystals comprises silver of a first physical character and said silver image derived from exposed silver halide crystals comprises silver of a second physical character, said first physical character silver possessing higher optical density than said second physical character silver per unit mass.

26. A photographic process as defined in claim 24 which comprises, in combination, the steps of exposing a photographic film unit which comprises a permanent fixed laminate containing a transparent support carrying on one surface, in order, a multicolor screen, a first substantially photoinsensitive layer comprising silver-preciptating nuclei dispersed in a processing composition permeable matrix, a photosensitive silver halide emulsion comprising photosensitive silver halide crystals dispersed in a processing composition permeable polymeric binder, and a second substantially photoinsensitive layer comprising silver-precipitating nuclei dispersed in a processing composition permeable matrix, said silver-precipitating nuclei present in a concentration effective to provide upon development, as a function of exposure, a silver image derived from development of unexposed silver halide crystals possessing a maximum image density at least 1.0 density units greater than the maximum density of the silver image derived from development of exposed silver halide crystals, said exposure resultant from actinic radiation incident on said transparent support, contacting said silver halide emulsion with an aqueous processing composition containing a silver halide-developing agent and a silver halide solvent for a period of time effective to provide a visible silver image to said film unit in terms of the unexposed areas of said emulsion as a function of the point-to-point degree of emulsion exposure, said visible silver image derived from development of unexposed silver halide crystals and possessing a maximum image density at least 1.0 density units greater than the maximum density of developed silver derived from development of exposed silver halide crystals, and maintaining said laminate intact subsequent to said processing.

27. A photographic process as defined in claim 26 which comprises, in combination, the steps of exposing a photographic film unit which is a permanently fixed laminate and comprises a transparent support carrying on one surface, in order, a multicolor screen, a first substantially photoinsensitive layer comprising silver-precipitating nuclei dispersed in a processing composition permeable polymeric binder, a photosensitive silver halide emulsion comprising photosensitive silver halide crystals dispersed in a processing composition permeable polymeric binder, and a second substantially photoinsensitive layer comprising silver precipitating nuclei dispersed in a processing composition permeable polymeric binder, said silver-precipitating nuclei present in a concentration effective to provide upon development of exposed silver halide crystals a maximum silver image density not in excess of about 0.5 and a maximum silver image density derived from unexposed silver halide crystals upon processing of not less than about 1.5, said exposure accomplished by actinic radiation incident on said transparent support, contacting said silver halide emulsion with an aqueous-processing composition containing a silver halide-developing agent and a silver halide solvent for a sufficient time to provide a silver image to said film unit comprising a maximum density of image silver derived from development of unexposed silver halide crystals of not less than about 1.5 and a maximum density of image silver derived from development of exposed silver halide crystals not in excess of about 0.5, and maintaining said laminate intact subsequent to processing.

28. A photographic process as defined in claim 22 wherein said color screen comprises an additive color screen.

29. A photographic process as defined in claim 28 wherein said additive color screen comprises a trichromatic additive color screen comprising red, green and blue chromatic filter elements.

30. A photographic process as defined in claim 22 wherein said silver halide emulsion comprises a silver iodobromide emulsion.

31. A photographic process as defined in claim 30 wherein said silver iodobromide emulsion is panchromatically sensitized.

32. A photographic process as defined in claim 31 wherein said silver iodobromide emulsion comprises silver iodobromide crystals containing about 1 to 9 percent, by weight, iodide.

33. A photographic process as defined in claim 22 wherein said silver halide developing agent is disposed in said film unit prior to said contact of said unit with said aqueous processing composition.

34. A photographic process as defined in claim 24 wherein said processing composition permeable polymeric binder comprises gelatin.

35. A photographic process as defined in claim 34 which comprises, in combination, the steps of exposing a photographic film unit which comprises a permanent laminate containing a transparent support carrying on one surface, in order, a trichromatic additive color screen, comprising red, green and blue optical filter elements, a first substantially photoinsensitive layer comprising silver-precipitating nuclei dispersed in a processing composition permeable polymeric binder, a photosensitive silver halide emulsion comprising panchromatically sensitized silver iodobromide crystals dispersed in a processing composition permeable gelatin binder, and a second substantially photoinsensitive layer comprising silver-precipitating nuclei dispersed in a processing composition permeable polymeric binder, said binders possessing a lattice effective to substantially prevent microscopic diffusion of image silver components, said silver-precipitating nuclei present in a concentration effective to provide, upon development in the presence of a silver halide solvent and as a function of exposure, image silver derived from development of exposed silver iodobromide crystals possessing a maximum silver image density less than about 0.3 and a maximum silver image density derived from unexposed silver iodobromide crystals greater than about 1.8, said exposure accomplished by actinic radiation incident on said transparent support; contacting said exposed emulsion with an aqueous processing composition containing a silver halide-developing agent and a silver halide solvent for a time sufficient to provide a silver image to said film unit in terms of the unexposed areas of said emulsion possessing a maximum silver image density of not less than about 1.8 and a silver image of said emulsion in terms of the exposed areas of said emulsion possessing a maximum silver image density not in excess of about 0.3; and maintaining said laminate intact subsequent to processing.

36. A photographic process as defined in claim 35 wherein said silver-precipitating nuclei comprises metallic sulfides, metallic selenides or colloidal noble metals.

37. A photographic process as defined in claim 36 wherein said silver precipitating nuclei are dispersed in said silver iodobromide emulsion in a concentration of about 1 to 25 ×10$^{16}$ moles/ft.$^2$.

38. A photographic process as defined in claim 34 wherein said panchromatically sensitized emulsion additionally contains silica dispersed therein.

39. A photographic product which comprises a permanent composite film unit including a color screen having associated therewith, in order, a first layer comprising silver-precipitating nuclei; a developed, photoexposed silver halide layer and a second layer comprising silver-precipitating nuclei, said film unit containing a silver image possessing optical density inversely proportional to photoexposure of said stratum.

40. A photographic product as defined in claim 39 wherein said silver image includes a positive silver image in terms of unexposed areas of said film unit comprising silver of a first physical character and a negative silver image in terms of exposed areas of said film unit comprising silver of a second physical character, said first physical character silver possessing higher optical density per unit than said second physical character silver.

41. A photographic product as defined in claim 40 wherein said positive silver image possesses maximum density in unexposed areas of said film unit at least 1.5 density units greater than the maximum density of said negative silver image in exposed areas of said silver halide layer.

42. A photographic product as defined in claim 41 wherein said negative silver image possesses a maximum density in exposed areas of said silver halide stratum not in excess of about 0.5 and a maximum density of said positive silver image in unexposed areas of said film unit not less than about 2.0.

43. A photographic product as defined in claim 39 wherein said color screen is an additive color screen.

44. A photographic product as defined in claim 43 wherein said additive color screen is carried on a flexible transparent support and comprises a trichromatic color screen comprising red, green and blue colored optical filter elements.

UNITED STATES PATENT OFFICE
CERTIFICATE OF CORRECTION

Patent No. 3,615,428    Dated October 26, 1971

Inventor(s) Lucretia J. Weed

It is certified that error appears in the above-identified patent and that said Letters Patent are hereby corrected as shown below:

In the Specification:

Column 9, line 25, "$10^{16}$" should be --$10^{-6}$--.

Column 9, line 33, "$10^{123}$ and $10^{130}$" should be --$10^{-23}$ and $10^{-30}$--.

In the Claims:

Column 19, line 10, "$10^{16}$" should be --$10^{-6}$--.

Column 22, line 25, "$10^{16}$" should be --$10^{-6}$--.

Signed and sealed this 27th day of June 1972.

(SEAL)
Attest:

EDWARD M. FLETCHER, JR.
Attesting Officer

ROBERT GOTTSCHALK
Commissioner of Patents